US009821711B2

(12) United States Patent
Grosdidier

(10) Patent No.: US 9,821,711 B2
(45) Date of Patent: Nov. 21, 2017

(54) LIGHTING SYSTEM, IN PARTICULAR FOR A MOTOR VEHICLE LIGHTING MEMBER, COMPRISING A LIGHT-EMITTING ELEMENT OFFSET FROM THE LIGHT SOURCE

(71) Applicant: RENAULT S.A.S., Boulogne Billacourt (FR)

(72) Inventor: Francois Grosdidier, Sermaise (FR)

(73) Assignee: RENAULT S.A.S., Boulogne-Billancourt (FR)

( * ) Notice: Subject to any disclaimer, the term of this patent is extended or adjusted under 35 U.S.C. 154(b) by 0 days.

(21) Appl. No.: 14/906,188

(22) PCT Filed: Jul. 18, 2014

(86) PCT No.: PCT/FR2014/051854
§ 371 (c)(1),
(2) Date: Jan. 19, 2016

(87) PCT Pub. No.: WO2015/011382
PCT Pub. Date: Jan. 29, 2015

(65) Prior Publication Data
US 2016/0161073 A1 Jun. 9, 2016

(30) Foreign Application Priority Data
Jul. 22, 2013 (FR) ...................................... 13 57169

(51) Int. Cl.
*B60Q 3/74* (2017.01)
*F21S 8/10* (2006.01)
(Continued)

(52) U.S. Cl.
CPC .............. *B60Q 3/74* (2017.02); *B60Q 1/0052* (2013.01); *B60Q 1/2696* (2013.01); *B60Q 3/64* (2017.02);
(Continued)

(58) Field of Classification Search
CPC .. F21S 48/1241; F21S 48/1154; F21S 48/215; F21S 48/2206; F21S 48/225;
(Continued)

(56) References Cited

U.S. PATENT DOCUMENTS 5,580,156 A * 12/1996 Suzuki ..................... B60Q 7/00
116/63 P
7,441,913 B2 * 10/2008 Bayersdorfer ...... F16H 59/0278
362/23.11
(Continued)

FOREIGN PATENT DOCUMENTS

DE 10 2004 009 131 A1 9/2005
FR 2 794 218 A1 12/2000

OTHER PUBLICATIONS

International Search Report dated Nov. 17, 2014 in PCT/FR2014/051854.

*Primary Examiner* — Laura Tso
(74) *Attorney, Agent, or Firm* — Oblon, McClelland, Maier & Neustadt, L.L.P.

(57) ABSTRACT

A lighting system for a motor vehicle includes a printed circuit board equipped with light emitting diodes for emitting light beams in lighting directions and an optical module formed to propagate and transmit the light beams. The optical module has a reception surface to receive the light beams and an emission surface for retransmitting the light beams. The lighting system also includes at least one element for masking the light beams emitted by the light emitting diodes. The element for masking which extends from at least one of the light emitting diodes toward the reception surface and substantially parallel to the lighting direction of the at least one light emitting diode, over at least a part of the periphery of the at least one light emitting diode (Continued)

and over at least a part of a distance separating the at least one light emitting diode and the reception surface.

15 Claims, 2 Drawing Sheets

(51) Int. Cl.
    *B60Q 1/00*     (2006.01)
    *B60Q 1/26*     (2006.01)
    *B60Q 3/64*     (2017.01)

(52) U.S. Cl.
    CPC ........... *F21S 48/215* (2013.01); *F21S 48/225* (2013.01); *F21S 48/2206* (2013.01); *F21S 48/2262* (2013.01); *F21S 48/2281* (2013.01); *F21S 48/234* (2013.01); *F21S 48/24* (2013.01); *F21S 48/25* (2013.01); *F21S 48/255* (2013.01)

(58) Field of Classification Search
    CPC .. F21S 48/2262; F21S 48/2281; F21S 48/234; F21S 48/24; F21S 48/25; F21S 48/255; B60C 1/0052; B60C 3/004; B60C 1/2696; B60C 3/0279
    USPC ....... 362/490, 240, 248, 499, 489, 497, 541, 362/540, 542, 545, 543, 544
    See application file for complete search history.

(56) References Cited

U.S. PATENT DOCUMENTS

| | | | |
|---|---|---|---|
| 7,857,495 B2 * | 12/2010 | Misawa | B60Q 1/2607 362/308 |
| 8,047,676 B2 * | 11/2011 | Cheng | F21V 5/002 362/240 |
| 2003/0137838 A1 * | 7/2003 | Rizkin | F21V 7/0091 362/240 |
| 2003/0231506 A1 * | 12/2003 | Chen | B60Q 1/2688 362/487 |
| 2005/0135113 A1 * | 6/2005 | Wang | F21K 9/00 362/561 |
| 2005/0201100 A1 | 9/2005 | Cassarly et al. | |
| 2011/0260616 A1 | 10/2011 | Chaterlea et al. | |
| 2013/0155712 A1 * | 6/2013 | Kloos | F21S 48/1154 362/521 |

* cited by examiner

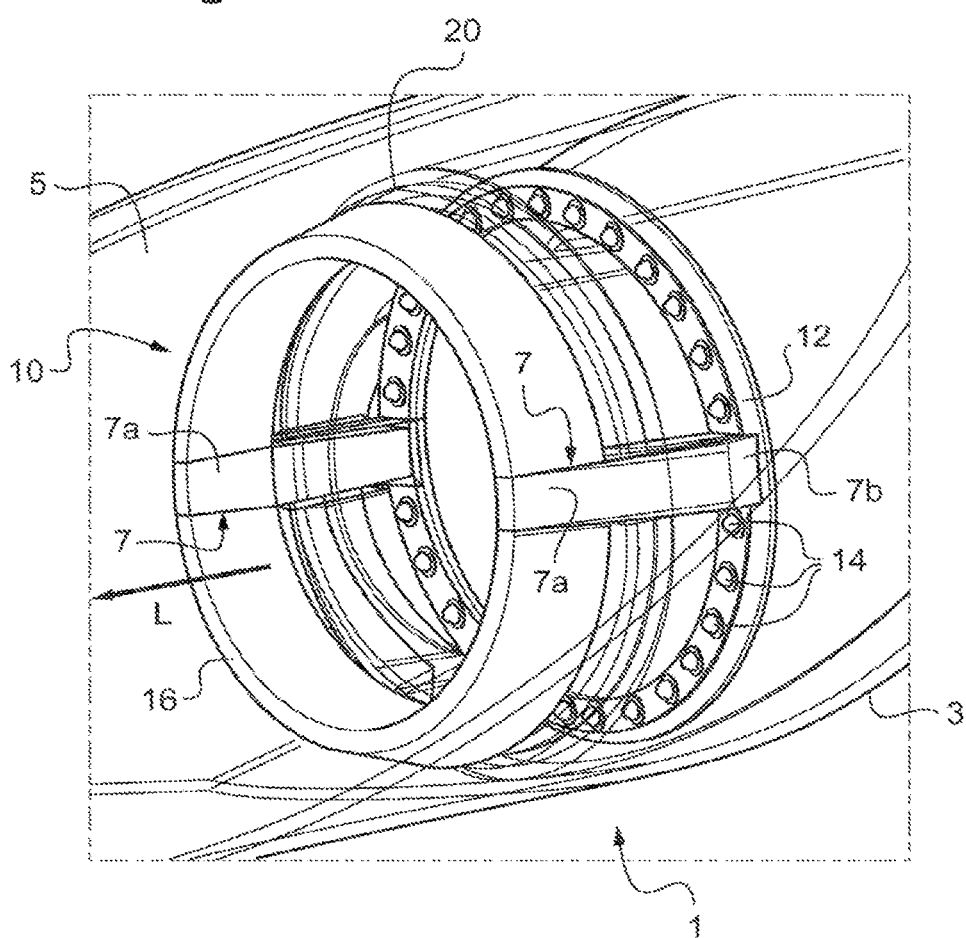

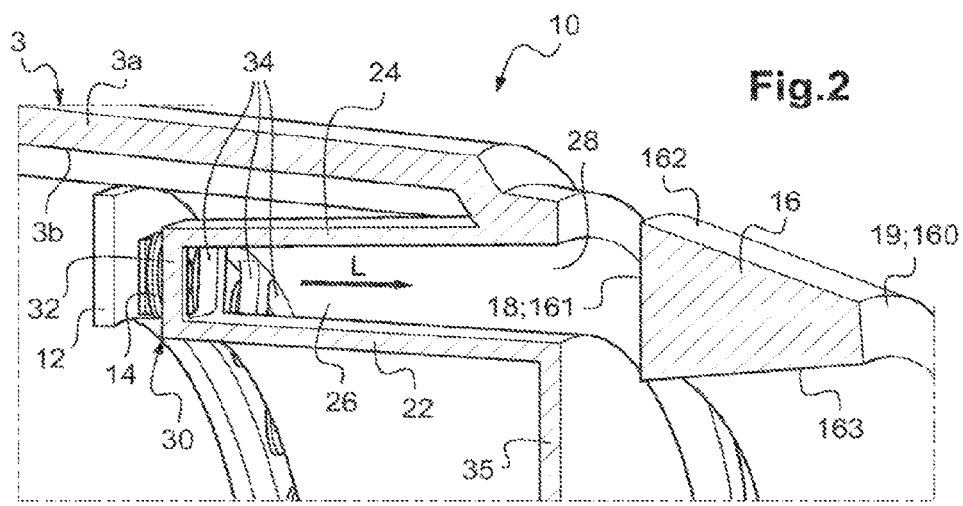
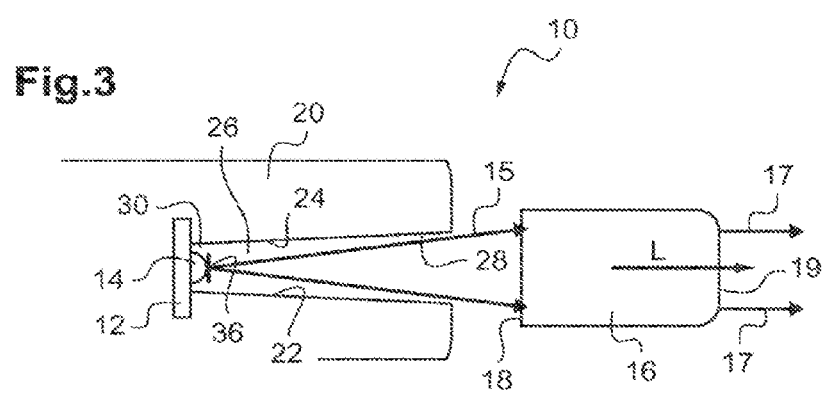

LIGHTING SYSTEM, IN PARTICULAR FOR A MOTOR VEHICLE LIGHTING MEMBER, COMPRISING A LIGHT-EMITTING ELEMENT OFFSET FROM THE LIGHT SOURCE

The invention relates to a lighting system, notably for a motor vehicle lighting member, with light-emitting element offset from the light source, notably in which the light source is concealed.

BACKGROUND

Some lighting systems comprise a printed circuit board equipped with light-emitting diodes, commonly called LEDs, electrically connected to the printed circuit. A printed circuit board, often referred to by the acronym PCB, is a support, generally a plate, making it possible to electrically link together a set of electronic components, in order to produce a complex electronic circuit. This plate is planar and made up of an assembly of one or more thin layers of copper separated by an insulating material. Such a plate can be rigid or flexible. In a lighting device, a printed circuit board, or plate, equipped with LEDs, is generally arranged at right angles to the desired lighting direction for a good light rendition, most of the light beam being emitted by the diodes in a direction at right angles to the printed circuit board. However, in the automotive field and in particular in application in a headlight, such a positioning, at right angles to the lighting direction, imposes a significant bulk on the headlight and constraints on the design.

There are moreover lighting systems involving a light optical module associated with LEDs to ensure a light guide function. The LEDs are then arranged at a short distance from the optical module in order for the optical module to receive the light emitted by the LEDs. The optical module is often incorporated in another element of the lighting system, for example a mask or a deflector. Such masks often extend at right angles to the lighting direction of the LEDs, at a distance therefrom. Such lighting systems thus consist of numerous elements to be arranged relative to one another which can make their assembly complex. Furthermore, such lighting systems can have a significant volume which can limit their arrangement and their form, which is not desirable, particularly in the automotive field. Moreover, in this type of lighting system, each LED is differentiated and visible. For esthetic reasons, it may be shrewd to improve the stylistic appearance of the lighting system while retaining its lighting functions.

There is therefore a need for a lighting system that makes it possible to at least partly remedy these drawbacks and vary the design.

BRIEF SUMMARY

To this end, one subject of the invention relates to a lighting system, notably for a motor vehicle headlight, comprising:
  a printed circuit board equipped with light-emitting diodes suitable for emitting light beams in lighting directions, and
  an optical module formed to propagate and transmit said light beams, having a reception surface intended to receive said light beams and an emission surface for retransmitting said light beams, characterized in that it comprises at least one element for masking the light beams emitted by said light-emitting diodes, which extends:
  from at least one light-emitting diode toward said reception surface,
  substantially parallel to the lighting direction of said at least one light-emitting diode, over at least a part of the periphery of said at least one light-emitting diode and over at least a part of the distance separating said light-emitting diode and said reception surface.

A light-emitting diode generally emits a plurality of light rays in a number of directions: the light beam made up of these rays thus generally exhibits a conical form. In the present application, the lighting direction of an LED is considered to be the direction of the axis of symmetry of the cone delimiting the light beam emitted by the LED.

The presence of the at least one masking element according to the invention makes it possible to position the LEDs at a distance from the optical module, without the light beam from the LEDs being visible in a direction transverse to the lighting direction between the LEDs and the optical module, the at least one masking element at least partially surrounding or framing the light beam emitted by the at least one LED. The optical module can thus be formed by an element distinct from the other elements of the lighting system, notably from the masking element while being illuminated by the LEDs in a continuous and uniform manner. Such a spacing between the LEDs and the optical module makes it possible to improve the lighting esthetic. In effect, the signaling element can have an esthetic appearance of "trompe-l'oeil" type, because it can in a way appear to be suspended, with no support or holding elements visible in the signaling module, the LEDs being masked by the at least one masking element, only the optical module appearing to be illuminated.

A masking element can be produced in any material that does not allow light rays to pass. It can advantageously be produced in an opaque polymer material, for example in polypropylene.

The optical module can be formed in a polymer material or in glass, preferably translucent or transparent, suitable for propagating and guiding at least one light beam circulating inside its volume, notably a light beam emitted by light-emitting diodes. The material used can be any material suitable for guiding a light ray, such as a material of glass or polymer type, colored or not, for example polycarbonate or poly(methylmethacrylate) (PMMA). Each optical module can thus be produced simply and its form can be adapted to the member intended to receive the lighting system.

The lighting system according to the invention can comprise a plurality of masking elements, one masking element being associated with one or more LEDs. It can then be advantageous for each masking element to totally surround one or more LEDs or for these masking elements to be linked to one another by walls substantially at right angles to the lighting directions of the LEDs in order to avoid any possibility of noticing the LEDs from the outside of the lighting system. This embodiment is not however preferred.

Advantageously and in a nonlimiting manner, the lighting system can comprise a single element for masking the light beams emitted by all of the LEDs, which can make it possible to simplify the production and the assembly of the lighting system. In this case, the single masking element extends:
  from all of the LEDs, for example arranged in a same plane, toward said reception surface, substantially parallel to the lighting directions of said LEDs, over at least a part of the periphery of the set of LEDs and over at least a part of the distance separating the set of LEDs and the reception surface of the optical module.

It can then be advantageous for the single masking element to totally surround the set of LEDs or for this single masking element to comprise at least one wall substantially at right angles to the lighting directions of the LEDs in order to avoid any possibility of noticing the LEDs from outside the lighting system.

For a simpler embodiment, it can be advantageous for the printed circuit board to be arranged in such a way that the LEDs emit in parallel or substantially parallel lighting directions L.

For a simpler embodiment, it may also be advantageous to arrange the LEDs in a same plane along a rectilinear or curved line, for example a circular line. The printed circuit board can then be a planar plate of polygonal or elliptical form, for example circular and possibly annular.

The optical module can then have a form whose section (transversely to the lighting direction of the LEDs) has a form similar to the form of the line formed by the LEDs. For example, if the LEDs are arranged in a circle, the optical module can be in the form of a cylindrical or tapered crown ring, or in cone or hemisphere form.

Advantageously, a single masking element can then also have a form similar to the form of the optical module, for example a cylindrical or tapered crown ring form, or a tapered form.

Advantageously and in a nonlimiting manner, the optical module can extend substantially at right angles to the lighting direction of the LEDs and/or the reception surface of the optical module extends in a plane substantially at right angles to the lighting direction of the LEDs. The optical module can further be supported by a housing also supporting the masking element or elements and the printed circuit board equipped with LEDs.

In order to further limit the number of parts, said at least one masking element can be incorporated in a housing, notably situated inside the housing, or can form a housing. This housing can serve to support the circuit board to be printed and the optical module, and possibly other elements of the lighting system.

The at least masking element can extend to the optical module. However, this embodiment is not preferred from an esthetic point of view and it is preferable for the reception surface of the optical module not to be in contact with the masking element. As an example, a distance of 5 mm to 2 cm can separate the at least one masking element from the reception surface.

Advantageously and in a nonlimiting manner, the at least masking element can extend from said at least one light-emitting diode over at least 50%, even over at least 60%, of the distance separating this light-emitting diode and said reception surface. Advantageously, the at least masking element can extend over a distance that is sufficient to hide the LED and the printed circuit board.

Advantageously and in a nonlimiting manner, the at least masking element can extend from said at least one light-emitting diode over at most 95%, even over at most 75%, of the distance separating this light-emitting diode and said reception surface. The increase in the distance between the at least one masking element and the reception surface makes it possible to improve the esthetic effect of the lighting system.

Advantageously and in a nonlimiting manner, the lighting system can comprise a collimation device associated with each light-emitting diode and arranged to collimate the light beam toward said reception surface. This can make it possible to improve the illumination of the optical module by making the light beams converge on its reception surface.

A collimation device can be arranged in such a way as to have 70 to 100% of the light radiation emitted by the light-emitting diodes, preferably from 80 to 100% of the radiation, even from 90 to 100% of the radiation, converge on said reception surface.

Such a collimation device is preferably situated in immediate proximity to an LED.

Generally, the light ray collimation device can involve one or more conventional optical elements of Fresnel lens, diopter, prism or facet type.

Optionally, the dimension of the reception surface will be able to be formed in such a way as to pick up all of the light radiation emitted by the light-emitting diodes, which can possibly after having passed through a collimation device.

Advantageously and in a nonlimiting manner, the at least one masking element can comprise at least two lateral walls substantially parallel to said lighting direction defining between them a groove comprising an open end emerging facing the reception surface of said optical module and a distal end from said open end in said lighting direction, said printed circuit board being situated at said distal end, inside or outside the groove.

Such an arrangement makes it possible to produce the at least one masking element simply, particularly when it is incorporated in a housing. In effect, one of the lateral walls can be produced in the extension of an edge of the housing.

The groove is thus delimited by two lateral walls, one called outer and the other called inner. The outer lateral wall can then be secured to the housing, in the extension of an edge of the housing, and the inner lateral wall can be secured to a wall substantially at right angles to the lighting direction and closing an empty space formed between the inner lateral wall and the housing or from one edge to the other of the inner lateral wall, for example when the inner lateral wall forms a cylinder or a truncated cone. These arrangements can make it possible to improve the concealment of the LEDs, particularly when the printed circuit board is situated outside the groove.

Advantageously and in a nonlimiting manner, the distal end of the groove can be closed by a bottom wall substantially at right angles to the lighting direction of said at least one light-emitting diode. This bottom wall then links said at least two lateral walls and can serve as support and/or immobilization for the fixing of the printed circuit board. When the latter is situated outside the groove, the bottom wall is then pierced for the passage of the light beams emitted by the LEDs.

It should be noted that the collimation devices can be fixed directly onto the printed circuit board or onto the masking element, for example onto the bottom wall of the masking element. As a variant, they can also close said distal end of the groove facing each LED.

The invention is not limited by a particular form of the at least one masking element. According to a particular embodiment, a single masking element can define a single groove, the form (in section transverse to the lighting direction) of which is similar to the arrangement of the LEDs.

Advantageously, when the LEDs are arranged in a same plane along a circular line, a single masking element can define a single groove in crown ring form and facing the opening of this groove, the optical module can have a hollow cylindrical or hollow truncated cone form, the axes of the groove and of the optical module coinciding.

Advantageously and in a nonlimiting manner, the lighting system can further comprise at least one element for fixing the optical module onto a housing or onto the at least one masking element. Notably, the at least one fixing element can make it possible to keep the optical module at a distance from the masking element.

The fixing element or elements can be rods or strips of different forms and sizes, such as rectangular. Preferably, the fixing element or elements are produced in materials identical to those of the optical module, namely a material suitable for propagating and transmitting light beams, which can make it possible to increase the "suspended" effect of the optical module, such elements causing little or no disturbance to the propagation of the light.

The number of the fixing elements is not limited, provided that it can ensure the holding function.

Generally, at least two fixing elements are used, but a single fixing element is also possible.

The fixing element or elements can be fixed onto an external surface of the optical module by an end zone of said elements, the opposite end zones being able to be fixed onto the housing or the at least one masking element.

The invention relates also to a motor vehicle lighting member equipped with a lighting system according to the invention.

This lighting member can notably be chosen from a headlight (or optical block) for vehicle signaling and an ambience light intended to be situated inside the vehicle interior. Preferably, the member is a headlight.

A lighting member usually comprises a housing of which one face is translucent or transparent for the output of the light beam. The lighting system according to the invention is then arranged inside the housing, the lighting direction of the LEDs exiting through the translucent or transparent face of the housing.

The at least one masking element of the lighting system of the invention can be incorporated in the housing of the lighting member. It can for example be produced in a single piece therewith.

Another subject of the invention relates to a motor vehicle equipped with at least one lighting system according to the invention.

In particular, said lighting system can equip at least one of the following members:
an ambience light situated inside the vehicle interior,
a vehicle signaling light.

This signaling light, front or rear, can notably be chosen from a daytime running light (light that comes on automatically when the vehicle starts to move, also known by the acronym DRL), a side light, a reversing light, a fog lamp, a flashing light, a stop light or any other signaling light.

BRIEF DESCRIPTION OF THE DRAWINGS

The invention is now described with reference to the attached, nonlimiting drawings, in which:

FIG. 1 is a partial perspective view of a vehicle headlight equipped with a lighting system according to the invention;

FIG. 2 is a perspective view in partial cross section of the lighting system of FIG. 1;

FIG. 3 represents a partial schematic view in section of the lighting system of FIG. 1.

DETAILED DESCRIPTION

"Substantially parallel" should be understood to mean a direction forming an angle of at most ±20° or at most ±10° with a particular direction.

FIG. 1 partially represents a headlight 1 for the signaling of the vehicle, comprising a housing 3 of which one face 5 is translucent or transparent for the output of the light beams. This face 5 can adopt any planar or more complex form as in the example represented.

This headlight 1 is equipped with a lighting system 10 according to the invention, which is represented in more detail in FIGS. 2 and 3.

The lighting system 10 thus comprises:
a printed circuit board 12 equipped with light-emitting diodes 14 suitable for emitting light beams in a lighting direction (L) (for more clarity, a single diode is represented in FIG. 3), and,
an optical module 16 formed to propagate and transmit said light beams, having a reception surface 18 intended to receive said light beams and an emission surface 19 for retransmitting said light beams.

In the example represented, the lighting directions of the light beams of all of the LEDs 14 emit substantially parallel to a same lighting direction L. These LEDs 14 are arranged in a circular line in a same plane at right angles to the lighting direction L. They are supported and powered by a printed circuit board 12 which is itself of annular form.

According to the invention, the lighting system 10 comprises an element 20 for masking the light beams emitted by the LEDs 14. This masking element 20 extends:
from the LEDs 14 toward the reception surface 18,
substantially parallel to the lighting direction L of the LEDs 14, over at least a part of the periphery of all of the LEDs 14 and over at least a part of the distance separating the set of LEDs and the reception surface 18.

The masking element 20 is in a material that does not allow the light rays to pass, such as an opaque polymer material. In FIG. 1, this masking element is however represented as transparent to make it possible to distinguish the printed circuit board 12 and the LEDs 14.

The masking element 20 represented comprises two lateral walls 22, 24 substantially parallel to said lighting direction L. These lateral walls 22, 24 define a groove 26 comprising an open end 28 emerging facing the reception surface 18 of said optical module and a distal end 30, away from the open end 28 in said lighting direction L.

The printed circuit board 12 is situated at this distal end 30.

In the example represented, as can be seen in FIG. 2, the groove 26 has a tapered crown ring form widening toward its open end 28. The groove 26 is also closed by a bottom wall 32 on the side of its distal end 30 from the open end 28. The printed circuit board 12 is arranged in proximity to this bottom wall 32, outside of the groove 26, a through orifice 34 provided in the bottom wall 32 allowing for the passage of the light beam emitted by the LED 14.

In this example, the bottom wall 32 has as many through orifices 34 as LEDs 14, each orifice 34 being situated facing an LED 14.

In variants that are not represented, this bottom wall could however be solid, with no orifices 34, the printed circuit board 12 then being arranged inside the groove 26. The printed circuit board 12 could even form the bottom wall of the groove 26.

Finally, the masking element 20 forms part of the housing 3, as can be seen more particularly in FIG. 2. In this FIG. 2, it will be noted that the masking element 20 is produced in a single piece with a wall 3a of the housing, which extends in a direction substantially parallel to the lighting direction L. The wall 3a of the housing can also be tapered or cylindrical, concentric with the annular board 12. The masking element 20 is situated facing an internal face 3b of this housing wall 3a, inside the housing. More specifically, its outer lateral wall 24 is linked to the wall 3a on the side of the open end 28 of the groove 26. The LEDs 14 are thus entirely concealed. Furthermore, in this example, a masking wall 35 substantially at right angles to the lighting direction L extends from the inner lateral wall 22 on the side of the open end 28 of the groove 26, over the entire internal surface of the housing. This masking wall 35 could however be replaced by another lighting element (not represented).

In the example represented in FIGS. 1 and 2, the optical module 16 has a tapered crown ring form having a front outer surface 160, a rear outer surface 161 parallel to the front outer surface 160, these two front and rear outer surfaces 160 and 161 respectively being planar and linked by lateral outer surfaces 162, 163, respectively outer and inner, which form the lateral walls of the truncated cone which converge toward the front outer surface 160. This optical module 16 is for example in transparent PMMA. In the example represented, the front 160 and lateral 162 and 163 outer surfaces form the emission surface 19 of the optical module 16, the rear outer surface 161 forms the reception surface 18 of the optical module 16. The latter is situated at a distance from the open end 28 of the masking element 20, and extends at right angles to the lighting direction L.

Thus, the optical module 16, the masking element 20 and the printed circuit board 12 all have circular forms in cross section (at right angles to the lighting direction), and their axes are concentric. These elements could however have other forms with symmetry of revolution arranged also concentrically.

The optical module 16 can be fixed to the housing 3 by two diametrically opposite fixing elements 7, represented in FIG. 1. Each fixing element 7 is formed from a rectangular strip of the same material as the optical module 16 (here, PMMA), one end 7a of which is secured to the optical module 16 and the other end 7b of which is fixed to the housing 3, outside of the wall 3a thereof. These fixing elements 7 ensure that the optical module 16 is held at a distance from the masking element 20 and from the housing 3.

FIG. 3 schematically represents the lighting system of FIG. 2 and more particularly shows the directions taken by the light rays emitted by the LED 14. The LED 14 thus emits a light beam 15 which enters into the optical module 16 through its reception surface 18. The light beam 17 transmitted by the optical module 16 exits through the emission surface 19 thereof.

In order to avoid a loss of light radiation emitted by the LED 14, a collimation device 36 is arranged in front of the LED 14, this device being arranged in order for the cone of the light beam 15 not to enter into contact with the masking element 20. Furthermore, it will be noted that the reception surface 18 is greater than the section of the open end 28 of the groove 26 in order to pick up all of the light beam 15.

The lighting member 1 described with reference to the figures is a motor vehicle headlight.

However, the invention is in no way limited by the type and the form of the lighting member, which can also be an interior or exterior lighting member for a vehicle or a building.

The lighting system according to the invention in effect offers the advantage of being able to be used in numerous members for which efforts are particularly focused on reducing the bulk and the weight and on improving the appearance.

The invention claimed is:

1. A lighting system for a motor vehicle, comprising:
   a printed circuit board equipped with light emitting diodes configured to emit light beams in lighting directions;
   an optical module configured to propagate and transmit said light beams, having a reception surface configured to receive said light beams and an emission surface configured to retransmit said light beams, the reception surface and emission surface being parallel to each other; and
   at least one masking element configured to mask said light beams emitted by said light emitting diodes, wherein each said at least one masking element extends:
      from at least one of the light emitting diodes toward said reception surface, and
      substantially parallel to the lighting direction of said at least one of the light emitting diodes, over at least a part of a periphery of said at least one of the light emitting diodes, and over at least a part of a distance separating said at least one of the light emitting diodes and said reception surface,
   wherein said at lent one masking element defines a groove in the form of a tapered crown ring that increases in cross-sectional dimension to an open end of the groove,
   wherein said reception surface of the optical module is separated from the open end of the groove in the lighting direction by an air gap, and
   wherein said at least one of the light emitting diodes is closer to the open end of the groove than to said reception surface of the optical module.

2. The lighting system as claimed in claim 1, wherein said at least one masking element is a single element configured to mask said light beams emitted by all of said light emitting diodes.

3. The lighting system as claimed in claim 1, wherein said at least one masking element is incorporated in a housing.

4. The lighting system as claimed in claim 3, wherein said at least one masking element is situated inside the housing.

5. The lighting system as claimed in claim 1, wherein said at least one masking element forms a housing.

6. The lighting system as claimed in claim 1, wherein said at least one masking element extends from said at least one of the light emitting diodes over at least 50% of the distance separating said at least one of the light emitting diodes and said reception surface and over at most 95% of the distance.

7. The lighting system as claimed in claim 1, wherein said at least one masking element extends from said at least one of the light emitting diodes over at least 50% of the distance separating said at least one of the light emitting diodes and said reception surface or over at most 95% of the distance.

8. The lighting system as claimed in claim 1, further comprising:
   a collimation device associated with each of the light-emitting diodes and arranged to collimate said light beam from each of the light-emitting diodes toward said reception surface.

9. The lighting system as claimed in claim 1, wherein said at least one masking element includes at least two lateral walls substantially parallel to said lighting direction of said at least one of the light emitting diodes, and defining the groove, the groove further having a distal end opposite said open end in said lighting direction of said at least one of the light emitting diodes, said printed circuit board being situated at said distal end, inside or outside the groove.

10. The lighting system as claimed in claim 9, wherein the distal end of the groove is closed by a bottom wall substantially at right angles to said lighting direction of said at least one of the light emitting diodes.

11. The lighting system as claimed in claim 10, wherein said bottom wall is pierced.

12. The lighting system as claimed in claim 1, further comprising:
- at least one fixing element configured to fix the optical module onto a housing or onto said. at least one masking element, the at least one fixing element including a material that propagates and transmits light beams.

13. A motor vehicle lighting member, comprising:
the lighting system as claimed in claim 1.

14. The lighting member as claimed in claim 13, wherein the motor vehicle lighting member is a headlight of the motor vehicle.

15. A motor vehicle, comprising.:
- at least one lighting system as claimed in claim 1, said at least one lighting system being comprised in at least one of:
- an ambience light situated inside an interior of the motor vehicle, and
- a signaling light of the motor vehicle.

* * * * *